UNITED STATES PATENT OFFICE.

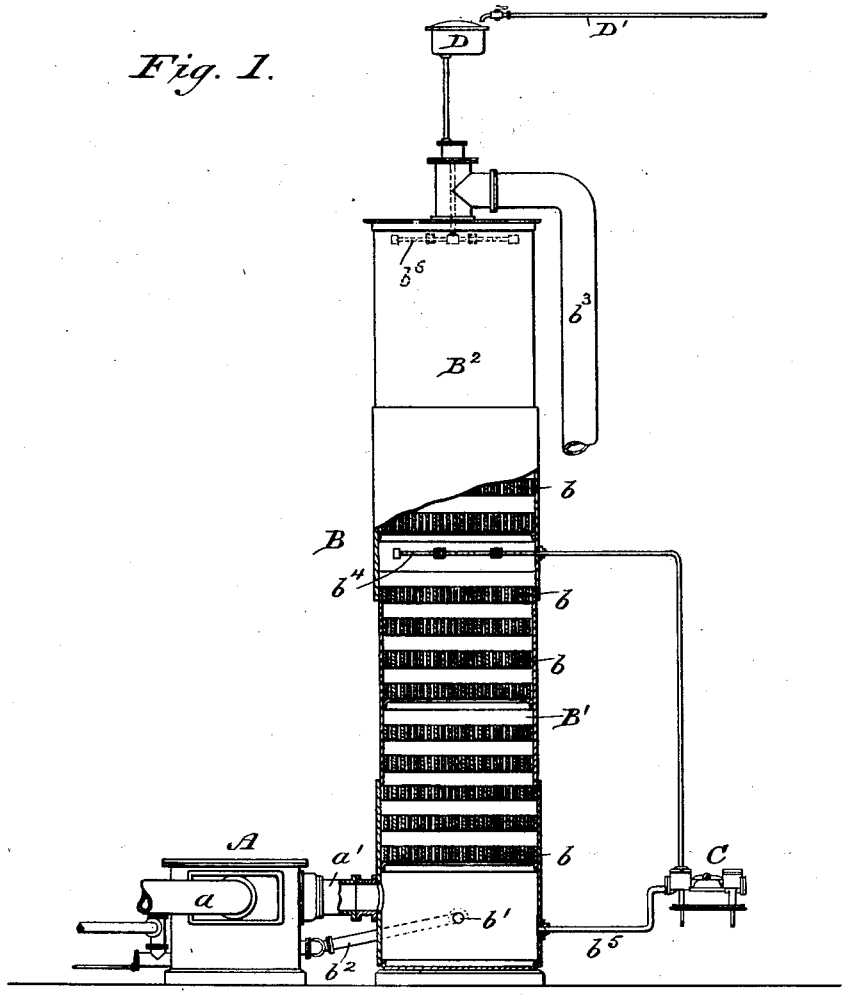

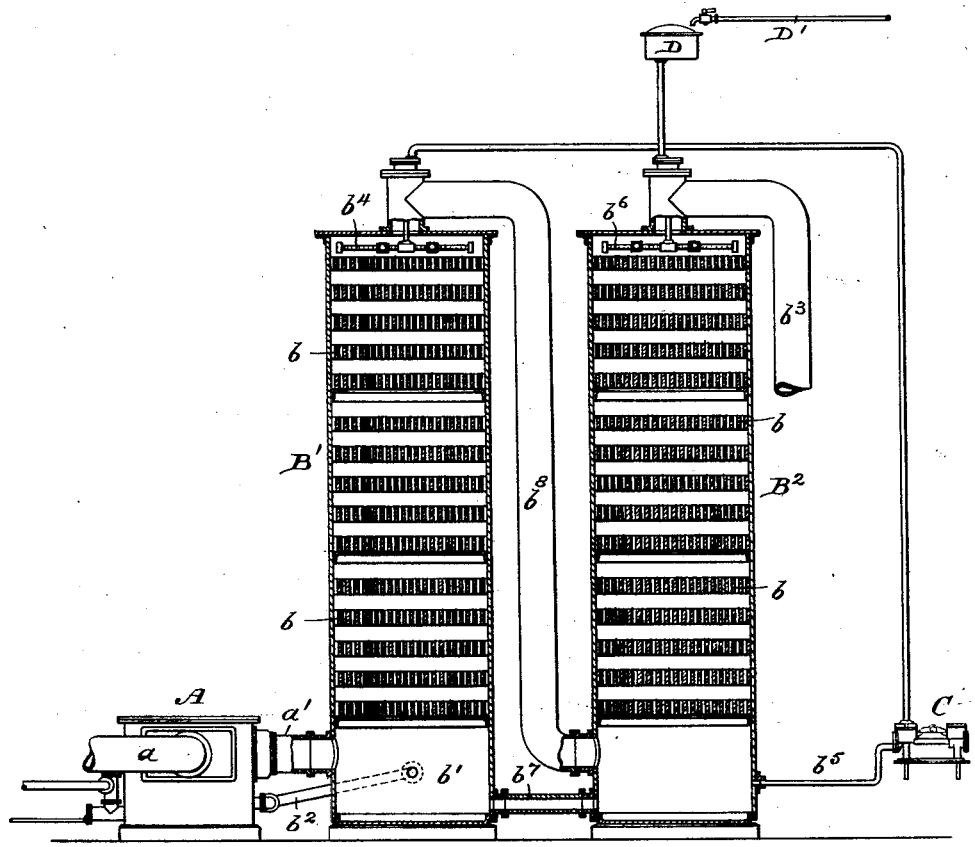

PIERRE PLANTINGA, OF CLEVELAND, OHIO.

GAS-SCRUBBING APPARATUS.

No. 890,450.  Specification of Letters Patent.  Patented June 9, 1908.

Application filed May 31, 1904. Serial No. 210,400.

*To all whom it may concern:*

Be it known that I, PIERRE PLANTINGA, a citizen of the United States, resident of Cleveland, county of Cuyahoga, and State of Ohio, have invented a new and useful Improvement in Gas-Scrubbing Apparatus, of which the following is a specification, the principle of the invention being herein explained and the best mode in which I have contemplated applying that principle so as to distinguish it from other inventions.

My invention relates to devices for removing impurities, and particularly for removing ammonia, from illuminating gas, that class of such devices being technically known as "scrubbers".

The object of the invention is to provide means for effecting the scrubbing operation which will be economical in construction and efficient in its operation.

Said invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings:— Figure 1 represents an elevational view of an apparatus, partly in section embodying my invention. Fig. 2 represents a similar view of a modified form of apparatus.

The said apparatus consists of two main elements, namely a primary washing device or "washer" A, and a secondary washing device or scrubber B. The said washer A may be of any desired construction such as is used to effect a removal of ammonia, which may be designated as primary insofar as relates to the process effected by my hereinafter described improved apparatus. The said washer need not hence be described in detail further than to state that it consists of a reservoir for water, through which the gas passes from an inlet pipe $a$, such gas passing out through an outlet or discharge pipe $a'$ connected, as will be further described, with the scrubber B.

Under ordinary conditions from 40 to 45 percent. of the ammonia contained in the gas is removed before the latter enters the washer; of the remainder about 40 percent. will be removed by the washer, and about 60% removed by the scrubber. The removal of the latter amount of ammonia is, as will be further described, accomplished in two steps, about 45 percent. being removed in one step and the remaining 15 percent. in the other.

The said scrubber, in the form illustrated in Fig. 1, consists mainly of a tower which is divided into an upper compartment $B^2$ and a lower compartment $B'$, each compartment being provided with means for finely dividing or comminuting liquid which may be caused to flow down through it. Such means I have shown to consist of a series of horizontal wooden trays $b\ b$ each composed of checker-work, but they may consist of layers of coke, excelsior or similar material. The bottom of compartment $B'$ forms an inclosed reservoir $b'$ into the upper part of which the gas discharge pipe $a'$ of the washer leads, and which is also connected with the reservoir of said washer by means of an overflow pipe $b^2$ through the medium of which liquor in reservoir $b'$ may flow into the reservoir of washer A, as will be readily understood. A discharge duct $b^3$ leads from the top of compartment $B^2$ and conducts the gas after having passed through the tower, to the purifiers. At the top of compartment $B'$, is a spraying spider $b^4$ made of perforated pipe, which is connected with a pump C. The latter draws its supply of liquor from the reservoir $b'$ with which it is properly connected, as shown, by means of a pipe $b^5$. By such means the liquor from reservoir $b'$ is pumped up to the top of compartment $B'$, sprayed and flows back into the said reservoir, it being, however, subjected to the comminuting operation in transit.

Above compartment $B^2$ is a flushing tank D which is fed from a fresh-water supply pipe $D'$, by means of which a supply of fresh water is periodically fed to a spider $b^6$ which sprays same into the top of compartment $B^2$. Such fresh water passes downwardly through compartments $B^2$ and $B'$ and finally reaches reservoir $b'$, being also subjected to the comminuting operation during such transit.

The form of apparatus illustrated in Fig. 2 differs from that shown in Fig. 1, only in the relative disposition of the two compartments $B'\ B^2$. These, instead of being superimposed, are placed side by side, and the reservoir $b'$ is divided into two parts freely connected, however, by a pipe $b^7$. An intermediate gas-duct $b^8$ is further required to conduct the gas from the top of the first compartment B' to the bottom of the second B². The periodic flushing device D is disposed above compartment B² as in the other construction, and pump C is connected to raise the liquor from the portion of reservoir b' situated beneath compartment B² and discharge it through spraying spider b⁴ in the top of compartment B'.

In use the operation of either form of scrubber is essentially the same. The course of the gas is into washer A by way of inlet a, through said washer, thence by way of duct a' to the first compartment B' and upwardly through the same, and finally upwardly through second compartment B², passing first through intermediate duct b⁸ in case the two compartments are situated side by side, instead of one above the other. Having been thus passed through the scrubber the gas is conducted away through discharge duct b³ leading from the top of the second compartment. The course of flow of the absorbing liquor is, at all places where it comes in contact with the gas, opposite in direction to the flow of such gas. Thus fresh water is admitted through spray b⁶ into the top of compartment B² and percolates downwardly through the scrubber filling in the same, and is brought into intimate contact with the stream of gas which is flowing upwardly therethrough. Since the amount of fresh water here introduced is relatively small, it is very apt, when sprayed in with a constant and necessarily small stream, to flow down through regular channels, and wet but a small part of the scrubber filling, with a relative decrease in efficiency. It is to overcome this difficulty of the water forming "rat holes", that I use the flushing device D in connection with the second compartment, which flushes the filling material at regular intervals. Thus, for instance, instead of admitting, say, $\frac{1}{10}$ of a gallon every second, the flushing apparatus admits three (3) gallons at intervals of one-half minutes; this comparatively large amount of water is readily evenly distributed.

The liquor, upon passing through compartment B², continues its course down through compartment B' in the first form of construction; in the second form it collects in the chamber b' in the bottom of such compartment, only, however, to be pumped to the top of the first compartment B' through which it flows as in the first case. After passing through this first compartment, the liquor collects in chamber b' of such compartment, from which it escapes by drain b² upon reaching the level of the inner opening, of the drain. The two chambers b', as has been stated, are freely connected, and the level of the liquid is accordingly the same in both. The pump sprays more of the liquor into compartment B' than there is fresh water sprayed into compartment B², and the bottom chamber b' of compartment B² in the second form would be pumped dry were not the bottom chamber of the two scrubbers connected as has been described. Enough liquor will therefore flow from the bottom of compartment B' to that of compartment B² to make up for the difference between the amount of liquor pumped and fresh water admitted, and an amount will regularly flow away through drain pipe b² equal to that of such fresh water admitted. In the first form of construction one bottom chamber only is employed.

The apparatus described, it is accordingly seen, provides for the gradual and successive removal of ammonia, the gas most heavily charged therewith meeting the strongest liquor first; as such gas advances it will be purer and is scrubbed with weaker liquor, which of course has greater absorptive power, until at the top of the last compartment it receives its last scrubbing with fresh water. The liquor is, furthermore, not exposed to the atmosphere during its progress through the scrubber and evaporation and consequent waste is thus avoided.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. A gas-purifying apparatus, comprising a primary washer, and a secondary washer consisting of two compartments, the top of the first of said compartments being connected with the bottom of the second so as to permit the flow of gas therethrough in series, means for periodically supplying fresh purifying liquid to the top of said second compartment, a pump for supplying such liquid, after it has passed through such second compartment, to the first, and an overflow pipe connecting said primary washer to said last-named compartment of the secondary washer.

2. A gas-purifying apparatus, comprising a primary washer, a secondary washer consisting of two compartments, a gas duct connecting the top of one of said compartments with the bottom of the other, means for periodically supplying fresh purifying liquid to one of said compartments, a pump for supplying such liquid, after it has passed through such one compartment, to the other, and an overflow pipe connecting said primary washer to said last-named compartment of the secondary washer.

3. A gas-purifying apparatus, comprising a primary washer, provided with a liquid reservoir, a secondary washer consisting of two compartments, a gas conduit connecting said primary washer with one of the compartments of the secondary washer, a gas duct connecting the top of one of said compartments with the bottom of the other compartment, means for periodically supplying fresh purifying liquid to one of said compartments, and a pump for supplying such liquid, after it has passed through such one compartment, to the other.

4. A gas-purifying apparatus, comprising a primary washer, provided with a liquid reservoir, a secondary washer consisting of two compartments, a gas conduit connecting said primary washer with one of the compartments of the secondary washer, a gas duct connecting the top of one of said compartments with the bottom of the other compartment, means for periodically supplying fresh purifying liquid to one of said compartments, such means consisting of a spray at the upper end of said compartment communicating with a flushing tank, and means for supplying such liquid, after it has passed through such one compartment, to the other, such means consisting of a pump and a spray at the upper end of such other compartment.

Signed by me, this 28" day of May, 1904.

PIERRE PLANTINGA.

Attested by:
G. W. SAYWELL,
A. E. MERKEL.